United States Patent [19]
Robbins, III

[11] Patent Number: 5,100,109
[45] Date of Patent: Mar. 31, 1992

[54] FENCE BOARD CONSTRUCTION AND RELATED PROCESS

[76] Inventor: Edward S. Robbins, III, 459 N. Court St., Florence, Ala. 35630

[21] Appl. No.: 388,824

[22] Filed: Aug. 3, 1989

[51] Int. Cl.$^5$ ............................................. E04H 17/14
[52] U.S. Cl. ........................................ 256/59; 256/1; 256/19; 138/119
[58] Field of Search ................... 138/119; 256/19, 59, 256/65, 1

[56] References Cited

U.S. PATENT DOCUMENTS

| | | |
|---|---|---|
| 2,197,318 | 4/1940 | Rumble . |
| 2,876,872 | 3/1959 | Roberts . |
| 2,997,277 | 8/1961 | Schwartz . |
| 3,032,151 | 5/1962 | Allen et al. . |
| 3,050,287 | 8/1962 | Bloch et al. . |
| 3,111,303 | 11/1963 | Olson . |
| 3,273,862 | 9/1966 | Miller . |
| 3,343,567 | 9/1967 | Mulligan et al. ............... 138/119 |
| 3,347,527 | 10/1967 | Andrews . |
| 3,406,946 | 10/1968 | Saultz ............................ 256/19 |
| 3,426,536 | 2/1969 | Danz . |
| 3,828,473 | 8/1974 | Morey ......................... 138/119 X |
| 4,124,196 | 11/1978 | Hipskind . |
| 4,124,198 | 11/1978 | Wong . |
| 4,186,912 | 2/1980 | Byrd, Jr. . |
| 4,339,114 | 7/1982 | Deike . |
| 4,380,327 | 4/1983 | Fish . |
| 4,465,263 | 8/1984 | Robbins, Jr. . |
| 4,576,364 | 3/1986 | O'Fearna . |
| 4,684,107 | 8/1987 | Robbins, Jr. . |
| 4,722,514 | 2/1988 | Pettit ............................ 256/19 X |

*Primary Examiner*—Andrew V. Kundrat
*Attorney, Agent, or Firm*—Nixon and Vanderhye

[57] ABSTRACT

Flexible fence board material is provided which comprises a length of hollow plastic material having a pair of face surface portions separated by upper and lower edge wall portions, wherein thinned hinge regions are provided at each of four corners along respective intersections of the face surface portions and upper and lower edge wall portions to thereby permit the fence board to be collapsed to a substantially flattened configuration which permits rolling of the material. Expansion and contraction joints are provided to facilitate end-to-end connection of adjacent boards, and shape retaining sleeves are provided which maintain the hollow, rectangular configuration, especially in long fence sections. A related process of constructing a fence system is also disclosed.

23 Claims, 2 Drawing Sheets

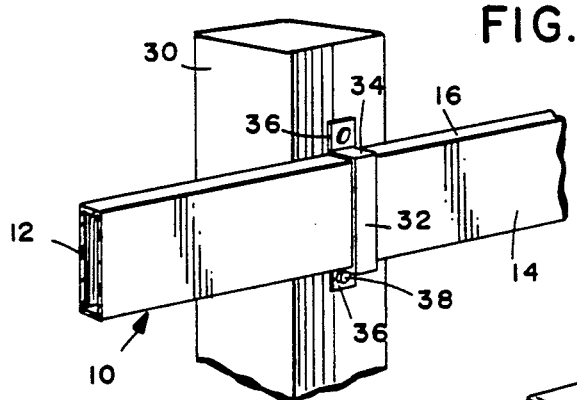
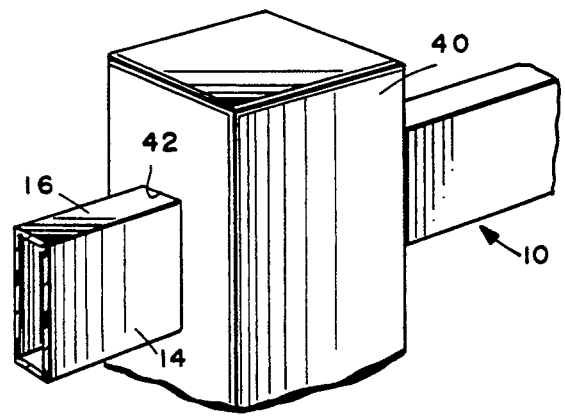
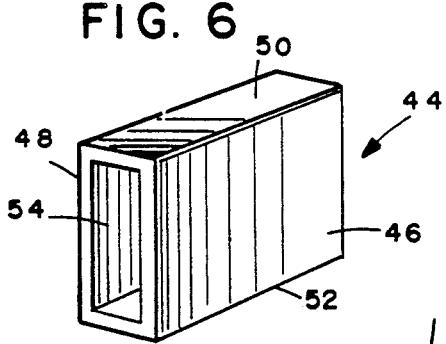
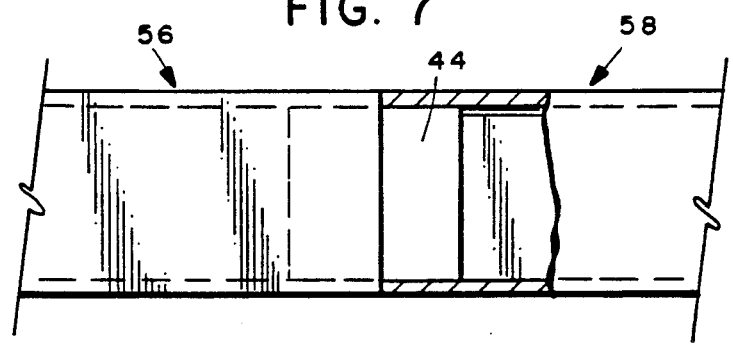
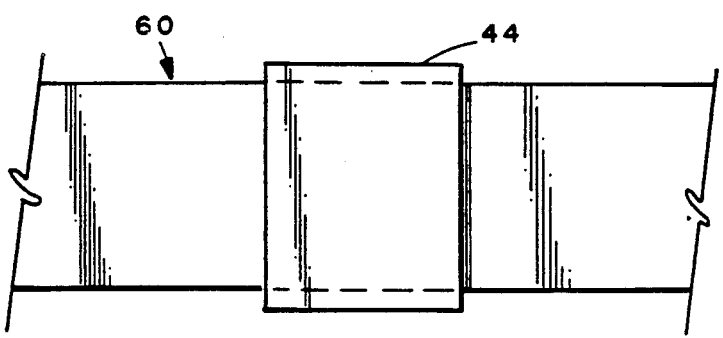

FENCE BOARD CONSTRUCTION AND RELATED PROCESS

BACKGROUND AND SUMMARY OF THE INVENTION

This invention relates to fencing systems in general, and to flexible, plastic fence boards or slats for use in such systems in particular.

It is well known in the patent literature to provide flexible, plastic fencing. For example, in my own prior U.S. Pat. Nos. 4,465,263 and 4,684,107, I disclose flexible, plastic webbing, reinforced with synthetic or steel wires which provide high strength fencing, especially adapted for livestock enclosures. Flexible, plastic webs or slats for fence constructions are also disclosed in U.S. Pat. Nos. 4,124,198; 3,347,527; 3,426,536 and 4,339,114.

It is also known to use flexible, plastic sheet material in fence constructions, and reference is made to U.S. Pat. Nos. 3,111,303 and 2,997,277 for representative examples.

One desirable characteristic for flexible, plastic fencing material is the ability to be rolled up for storage and shipment, so as to conserve space and therefore reduce costs. As a result, the prior art flexible fencing material is substantially of two-dimensional construction, i.e., it has measurable length and height dimensions but has no appreciable thickness or depth dimension which would otherwise cause the construction to be too rigid for rolling. However, there is also much interest in providing flexible fencing material which simulates conventional wood boards or slats which are generally on the order of ¾ of an inch thick or greater.

It is therefore the principal object of the present invention to provide a hollow, flexible, plastic fencing board material which can assume a first position where it has an appreciable thickness dimension so as to simulate a wooden board or slat, but which is collapsible to a substantially flattened configuration which permits rolling for storage and/or shipment.

In accordance with this invention, therefore, continuously extruded, hollow plastic material is produced having a generally rectangular configuration with well defined length, width and thickness dimensions. This fencing board material includes first and second face portions separated by upper and lower edge wall portions, thereby defining a hollow interior. In order to facilitate collapsing of the fence board material to a substantially flattened configuration, thinned regions extend along each of four intersections of the first and second face portions with the upper and lower edge wall portions, i.e., at and along the four corners of the rectangular construction. These thinned regions are formed by utilizing a suitably shaped core mandrel to cooperate with the interior surfaces of an extrusion die, so that the thinned region is not apparent from viewing the external surface of the plastic board. However, it will be appreciated that a core mandrel of rectangular cross section could be utilized in cooperation with an extrusion die which would be provided with suitable corner configurations to provide thinned areas externally visible at each of the four corner locations.

By providing thinned regions extending longitudinally along each of the corner intersections, the plastic fencing board or slat material of this invention is collapsible to a generally flattened condition wherein the upper and lower edge wall portions extend substantially parallel and coplanar with the first and second face portions. This configuration permits easy rolling of the material for shipment and/or storage.

Upon unrolling, desired lengths of material may be cut to form individual boards or slats. Thereafter, the boards or slats may be manually manipulated to the generally rectangular, hollow configuration, with the upper and lower edge wall portions extending substantially perpendicular to the first and second face portions, thereby providing a desirable degree of overall rigidity to the boards.

It is a feature of this invention that the plastic fence board or slat material may be attached to conventional fence posts of various shapes including square, rectangular or round with conventional brackets. Alternatively, the fencing board material of this invention may be utilized in conjunction with fence posts provided with holes (as in traditional split rail type fence configurations) where the elongated fence board material is inserted through the holes in the fence posts.

It is another feature of this invention to provide contraction/expansion joint members which are shortened, hollow, rectangular members of fairly rigid construction, and which have a cross sectional shape matching that of the fence board material in its expanded or installed configuration. The external dimensions of the expansion/contraction joint member are slightly less than the internal dimensions of the fence board material so that the joint members fit snugly within adjacent board ends. These members are designed to facilitate end-to-end attachment of two adjacent fence board members, to accommodate any expansion or contraction therebetween as a result of changes in temperature, for example, and to maintain the rectangular shape of the boards.

It is still another feature of this invention to provide a component similar to the expansion/contraction joint members, but wherein the internal dimension is matched to the external dimension of the fence board material so as to form an externally applied shape retaining sleeve. This is especially useful for very long sections of fence board where it is obviously desirable to insure that the hollow, rectangular shape of the fence board is maintained.

From the above, it will be appreciated that in one aspect, the present invention relates to a method of constructing a fence comprising the steps of (a) providing a roll of flexible fencing board material having a pair of opposed, elongated face portions and upper and lower edge walls in a substantially flattened configuration; (b) unrolling predetermined lengths of the fencing board material; (c) cutting the predetermined lengths of the fencing board material from the roll; (d) reforming the fencing board material to a substantially rectangular, hollow configuration; and (e) securing the predetermined lengths of fencing board material to at least a pair of spaced fence posts.

In another aspect, the invention relates to a fence board construction comprising a flexible length of plastic material having a pair of face surface portions separated by upper and lower edge wall portions, wherein thinned hinge regions are provided at each of four corners along respective intersections of the face surface portions and upper and lower edge wall portions to thereby permit the fence board to be collapsed to a substantially flattened configuration.

In still another aspect, the present invention relates to a roll of fence board material comprising an elongated length of flexible, plastic material in a substantially flattened configuration, and including four hinge areas, each extending in parallel along the length of the material, and located to permit reformation of the length upon unrolling to a hollow, rectangular configuration defined by a pair of face portions separated by upper and lower edge wall portions.

The invention also relates to a fencing system comprising a plurality of fence posts; a plurality of flexible fence boards, as described above, and a plurality of brackets and fasteners for securing the boards to the fence posts.

Other objects and advantages of the fence construction in accordance with this invention will become apparent from the detailed description of the invention in conjunction with the attached drawings.

BRIEF DESCRIPTION OF THE DRAWINGS

FIG. 4 is a partial perspective of the fence board material shown in FIG. 1 attached to a fence post in accordance with one exemplary embodiment of the invention;

FIG. 5 is a partial perspective of the fence board material shown in FIG. 1 attached to a fence post in accordance with another exemplary embodiment of the invention;

FIG. 6 is a perspective view of an expansion-contraction joint member, or shape retaining member for use with the fence board material of the invention;

FIG. 7 is a side view, partly broken away, showing an expansion-contraction joint installed at the juncture of two lengths of fence board material; and FIG. 8 is a side view of a shape retaining member installed on a length of fence board material in accordance with the invention.

DETAILED DESCRIPTION OF THE DRAWINGS

Figure 1:
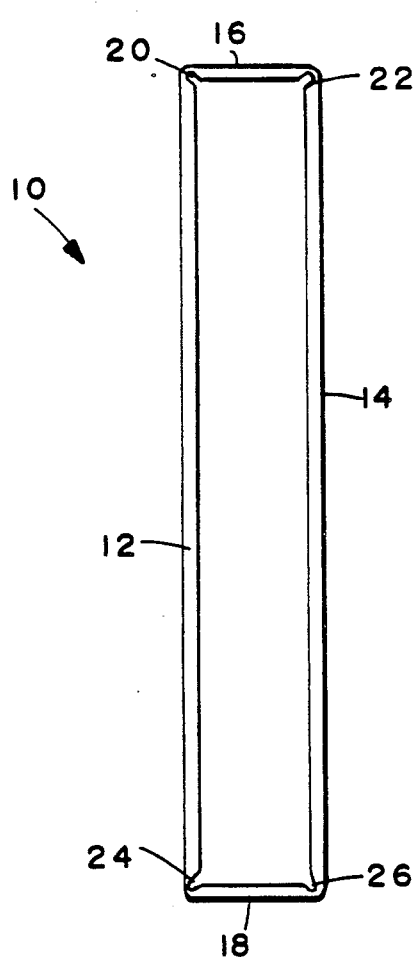
FIG. 1 is a cross sectional view of fence board material in accordance with an exemplary embodiment of the invention, the material shown in an expanded or installed configuration.

Referring to FIG. 1, flexible fence board material in accordance with this invention is shown at 10 and includes a first face portion 12, a second face portion 14, an upper edge wall portion 16 and a lower edge wall portion 18. As illustrated in FIG. 1, it is apparent that the fence board material has well defined length, height and width (or depth) dimensions, so as to simulate a standard wooden board. The fence board material of this invention is preferably formed in a continuous extrusion process to any predetermined length, preferably about 300 to 350 feet or more. The thickness of the face and edge wall portions is preferably about 0.050 to about 0.125 inches, while the edge wall portions 16 and 18 generally extend about 1 to about 2½ inches to thereby simulate the various widths of conventional solid wood fence boards or planks.

The height of the face wall portions preferably varies from about five inches to about seven inches, although it will be understood that this dimension may vary as desired.

Thinned regions 20, 22, 24 and 26 are provided along the material at four intersections of the edge wall and face wall portions. These thinned areas may be formed integrally during the extrusion process, by utilizing a suitably shaped core mandrel which cooperates with a suitably shaped extension die. Other suitable means may also be employed to form these thinned regions. In a preferred arrangement, the thinned regions will have thicknesses ranging from about 0.020 to about 0.030 inch so as to provide an integral "living" hinge at each of the corner intersections, and to thereby facilitate movement between the collapsed and installed configurations.

The board material itself is preferably a flexible thermoplastic having any of several known compositions which have good strength characteristics, and properties suitable for prolonged outdoor exposure.

Figure 2:
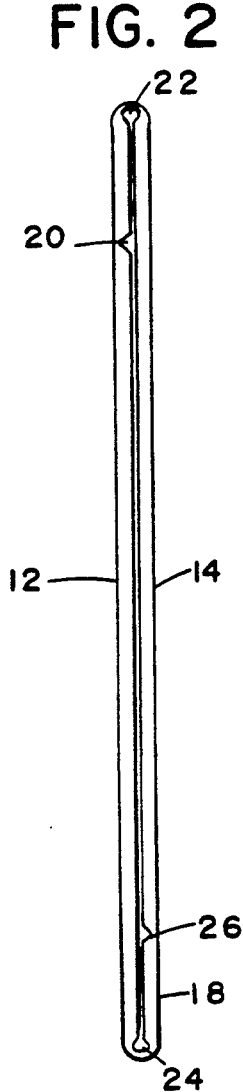
FIG. 2 is a cross sectional view of the fence board material illustrated in FIG. 1, but with the material illustrated in a collapsed or shipping configuration, capable of being rolled.

It will be appreciated that in the above described hollow or expanded configuration, the fence board material is too rigid to be rolled. However, the thinned regions 20, 22, 24 and 26 permit the fence board material to be collapsed to a substantially flat condition as illustrated in FIG. 2 where the upper edge wall portion 16 is substantially coplanar with the face surface 12 and the lower edge wall portion 18 is substantially coplanar with the other face wall portion 14. At the same time, wall portions 12 and 16 lie in substantially full surface engagement with wall portions 14 and 18 to create sheet-like web having a height of from about six inches to about twelve inches. This arrangement permits the flexible fence board material to be rolled about itself (or about a drum or the like) to substantially the rolled form illustrated in FIG. 3.

Figure 3:
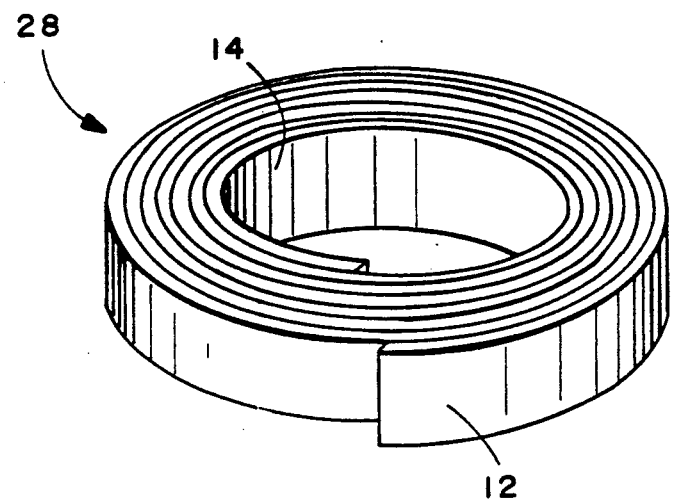
FIG. 3 is a perspective view of the fence board material shown in FIG. 2 in roll form.

In use, plastic fencing material in roll form, such as illustrated at 28 in FIG. 3, may be shipped to the site, unrolled in predetermined lengths, and cut. Prior to securing to a plurality of fence posts, the fence board material is easily manipulated to reform the shape of the material from the collapsed configuration shown in FIG. 2 to the expanded configuration shown in FIG. 1. The substantial width or depth dimension of the upper and lower edge wall portion 16, 18 impart a rigidity to the fence board material which enables it to be uniformly and accurately located between adjacent fence posts without undesirable sagging, curling or other dimensional irregularities.

With reference now to FIG. 4, the fence board material is shown attached to a conventional square fence post 30. A conventional U-bracket 32 having leg portions 34 which extend across the upper and lower edge wall portions 16, 18 may be secured to the fence posts 30 by nails 38 driven into the fence post through apertures provided in the flanges of the brackets. It will be appreciated that fence post 30 may be various shapes including square, rectangular, round, etc. and may be constructed of materials such as wood, PVC, etc. Other suitable fasteners, such as staples or the like, may also be employed, depending in part on the fence post material.

In an alternative arrangement, a fence post 40 is provided with a rectangular opening or aperture 42 formed therein which enables the fence board 10 to be slidably received therein.

In FIG. 6, an expansion-contraction joint member 44 is shown and comprises forward and rearward face portions 46, 48 and upper and lower edge wall portions 50 and 52 surrounding a hollow interior 54. This member is preferably constructed of a rigid plastic material and is sized to fit snugly within the hollow interior of the fence board material, for example, at the juncture of two fence boards 56, 58 as illustrated in FIG. 7. Not only does the member 44 serve to connect adjacent fence board sections in end-to-end relationship, but it also permits expansion and/or contraction of the fence board material as a result of temperature changes, for example, and also aids in maintaining the boards in their expanded configuration.

This component 44 may also be sized for external application to the fence board material in the form of a shape retaining sleeve as illustrated in FIG. 8. Here, the member 44' is slidably mounted on a length 60 of fence board. The sleeve thus provides a shape retaining means which is especially useful for long sections of fence board, and insures that the board will not revert to a collapsed configuration.

It is an additional feature of the invention, that when the fence board material is attached to a fence post, it may be fixedly attached so as to preclude any lateral movement of the board material, or it may be attached somewhat more loosely to permit lateral movement of the board material to accommodate thermal expansion-contraction, tensioning, etc. This may be accomplished by fixing the brackets to the fence posts relatively more tightly or loosely, as desired.

The fence board material of this invention is preferably constructed of any suitable thermoplastic polyolefin material and preferably is formed of a copolymer of polypropylene. Other materials may be utilized, and some metals such as aluminum may also be suitable. In any event, the choice of material will be governed by characteristics and properties related to strength, flexibility, durability and the like.

The fence system in accordance with this invention reduces shipping space and related costs. The invention also permits fencing systems to be supplied in kit form for end use by the customer, for example, with one or more rolls of plastic board material, expansion-contraction joints, shape retaining sleeves, brackets and fasteners all contained in a single package.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of constructing a fence comprising the steps of:
   (a) providing a roll of flexible fencing board material having a pair of opposed, elongated face portions and upper and lower edge walls in a substantially flattened configuration;
   (b) unrolling predetermined lengths of said fencing board material;
   (c) cutting said predetermined lengths of said fencing board material from said roll;
   (d) reforming each of said predetermined lengths of fencing board material to a substantially rectangular, hollow fence board configuration having open ends;
   (e) securing at least some of said fence boards to one or more spaced fence posts; and
   (f) employing one or more shape retaining members for maintaining said fence boards in said substantially rectangular, hollow configuration.

2. A method according to claim 1 wherein, in said flattened configuration, said pair of elongated face portions are in surface engagement with each other.

3. A method according to claim 2 wherein, in said rectangular, hollow configuration, said pair of elongated face portions are separated by said upper and lower edge walls.

4. A method according to claim 3 wherein said upper and lower edge walls extend substantially perpendicularly to said face portions in said rectangular configuration.

5. A method according to claim 1 and comprising, prior to step (a), the further step of forming longitudinally extending, thinned regions along the intersection of each said edge wall with each of said face portions.

6. A method according to claim 1 wherein, at least prior to step (b), one of said edge walls is in surface engagement with one of said face portions, and the other of said edge walls is in surface engagement with the other of said face portions.

7. A method of constructing a fence comprising the steps of:
   (a) extruding a hollow simulated fence board having length, width and height dimensions with integral hinge areas extending longitudinally along four corners;
   (b) rolling said fence board in a substantially flattened configuration;
   (c) unrolling said fence board, and cutting said fence board in predetermined lengths;
   (d) reforming each of said predetermined lengths of fence board to a hollow configuration having a substantially rectangular cross sectional shape; and
   (e) securing at least one end of each of said predetermined lengths of fence board to an associated fence post; and
   (f) employing one or more shape retaining members for maintaining said fence boards in said substantially rectangular, cross sectional shape.

8. A method according to claim 7 wherein said simulated fence board comprises a unitary plastic construction including a pair of elongated face surfaces connected by upper and lower edge surfaces.

9. A method according to claim 8 wherein, in the collapsed configuration, the upper and lower edge surfaces are substantially planar with respective ones of the elongated face surfaces.

10. A method according to claim 9 wherein, in the hollow, rectangular configuration, the upper and lower edge surfaces are substantially perpendicular to said elongated face surfaces.

11. A fencing system comprising:
    a plurality of fence posts;
    a plurality of flexible fence boards, each of said fence boards comprising a pair of face surface portions separated by upper and lower edge wall portions, wherein thinned hinge regions are provided at each of four corners along respective intersections of said face surface portions and said upper and lower wall portions; and further including one or more relatively rigid expansion-contraction joints, each of which comprises a hollow rectangular member, the exterior dimensions of which substantially correspond to interior dimensions of said flexible fence boards.

12. A fencing system according to claim 11 and further including one or more relatively rigid shape retaining sleeves, each of which comprises a hollow rectangular component, interior dimensions of which substantially correspond to exterior dimensions of said flexible fence boards.

13. A fencing system according to claim 11 and further including bracket means for fastening said plurality of fence boards to said plurality of fence posts.

14. A fencing system according to claim 11 wherein said plurality of fence boards are provided in the form of a roll, and wherein the face surface portions and upper and lower edge wall portions are in a substantially flattened configuration.

15. A fencing system according to claim 11 wherein said fence boards are constructed of flexible plastic material and said thinned hinge regions permit said fence boards to be collapsed to a substantially flattened configuration.

16. A fencing system according to claim 11 wherein said face portions and upper and lower edge wall portions have a thickness in the range from about 0.050 to about 0.125 inch.

17. A fencing system according to claim 11 wherein said thinned regions have a thickness of from about 0.020 to about 0.030 inch.

18. A fencing system according to claim 11 wherein, in an expanded, hollow configuration, said fence board has a thickness, defined by said upper and lower wall portions, of from about 1 to about 2.5 inches.

19. A fencing system according to claim 11 wherein in an expanded, hollow configuration, said fence board has a width, defined by the height of said face surface portions, of from about 5 to about 7 inches, and has a width in the flattened configuration of from about 6 to about 9.5 inches.

20. A fencing system according to claim 11 wherein said material is a unitary, continuously extruded length of thermoplastic polyolefin.

21. A method according to claim 1 wherein said shape retaining member comprises a relatively rigid joint adapted to fit within adjacent open ends of a pair of said fence boards.

22. A method according to claim 1 wherein said shape retaining member comprises a relatively rigid sleeve adapted to fit over adjacent open ends of a pair of said fence boards.

23. A fencing system comprising:
a plurality of fence posts;
a plurality of collapsible fence boards, each of said fence boards having a substantially hollow rectangular configuration and comprising a pair of face surface portions separated by upper and lower edge wall portions, wherein thinned hinge regions are provided at each of four corners along respective intersections of said face surface portions and said upper and lower wall portions; and further including one or more shape retaining members for maintaining said collapsible fence boards in said substantially hollow rectangular configuration.

* * * * *